Patented Aug. 13, 1929.

1,724,446

UNITED STATES PATENT OFFICE.

HARRY L. WORTHINGTON, OF SAN FRANCISCO, CALIFORNIA.

MAGNETIC MOTOR.

Application filed November 23, 1925. Serial No. 70,770.

This invention relates to improvements in magnetic motors and more particularly to motors driven by varying the course of the magnetic flux of magnets.

Among the objects of the invention are to provide means whereby the attraction and repulsion of permanent magnets for each other may be converted into motion, by intermittently introducing a shunt into the magnetic flux of one of a pair of magnets in juxtaposition, to create an attracting magnetic field; then withdrawing said shunt to create a repulsive magnetic field; to cause one of said magnets to be alternately attracted to and repelled from the other. Another object is to so combine and arrange a series of permanent magnets on a shaft suitably mounted to act as a rotor; then surround said rotor with a series of permanent magnets to create a magnetic field; then arrange means for intermittently modifying the flux path of the said magnets in the field to cause said rotor to rotate.

Two "horse shoe" magnets having their north and south poles arranged in juxtaposition to each other respectively will attract each other; and will repel each other if the north pole of one is arranged in juxtaposition to the north pole of the other; and they will attract each other if one of them is shunted by an armature placed across its poles. I have discovered that the power necessary to move the shunting armature, into and out of operative position, is reduced to the minimum by selecting a cylindrical armature and rolling it into and out of the polar field of the magnet and lifting it out of contact only at the point where polarity diminishes within the magnet which is at a point removed from the polar extremities of the magnet.

With the armature rolled to a position across the magnet poles, the lines of magnetic force are shunted and the other magnet becomes attracted. When the armature is rolled away from the polar extremities of the magnet, it becomes repulsive to the other magnet, if their respective north and south poles are arranged in opposition as stated. With the addition of outside force these magnets can be made to pass each other.

In this specification and the annexed drawings, the invention is illustrated in the form considered at this time to be the best, but it is to be understood that it is not limited to such form, because it may be embodied in other forms and it is also to be understood that in and by the claims following the description it is desired to cover the invention in whatsoever form it may be embodied.

Figure 1:
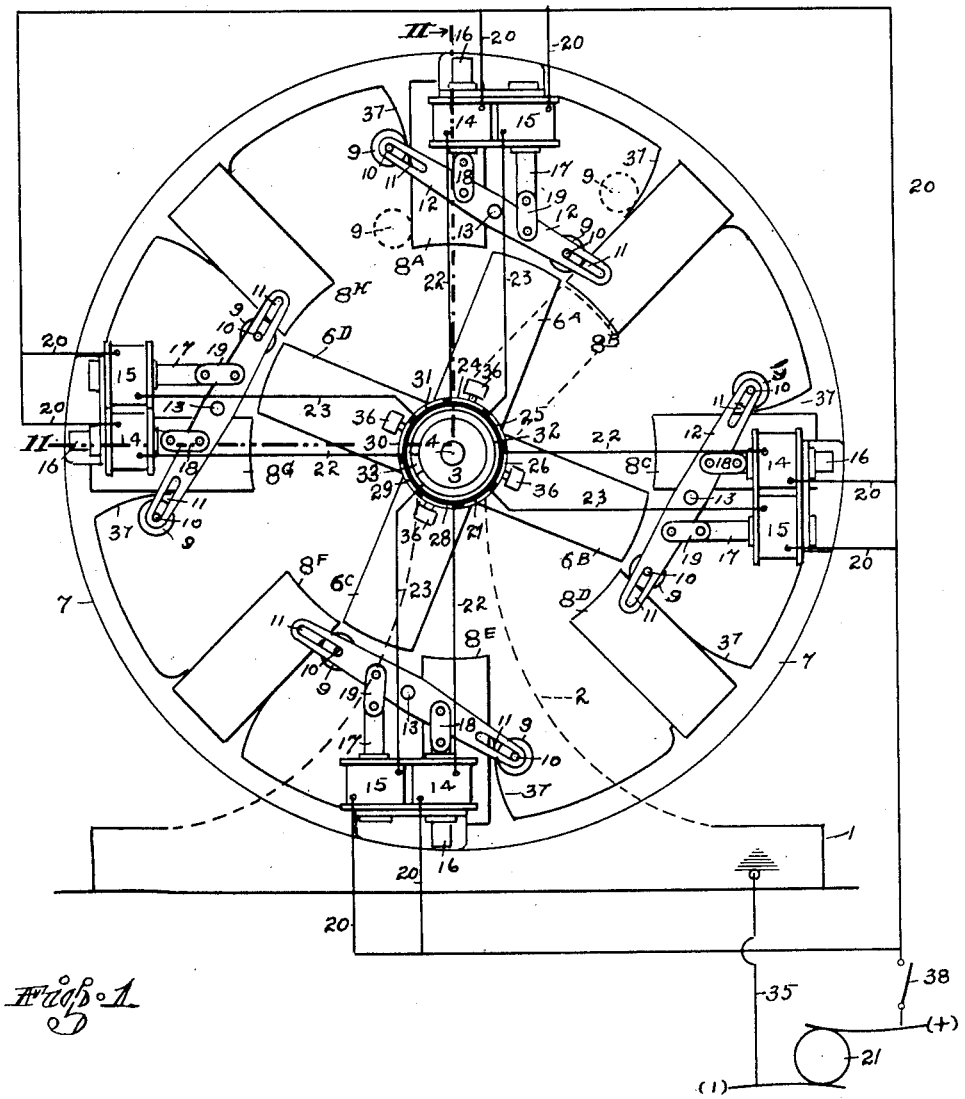
Figure 2:
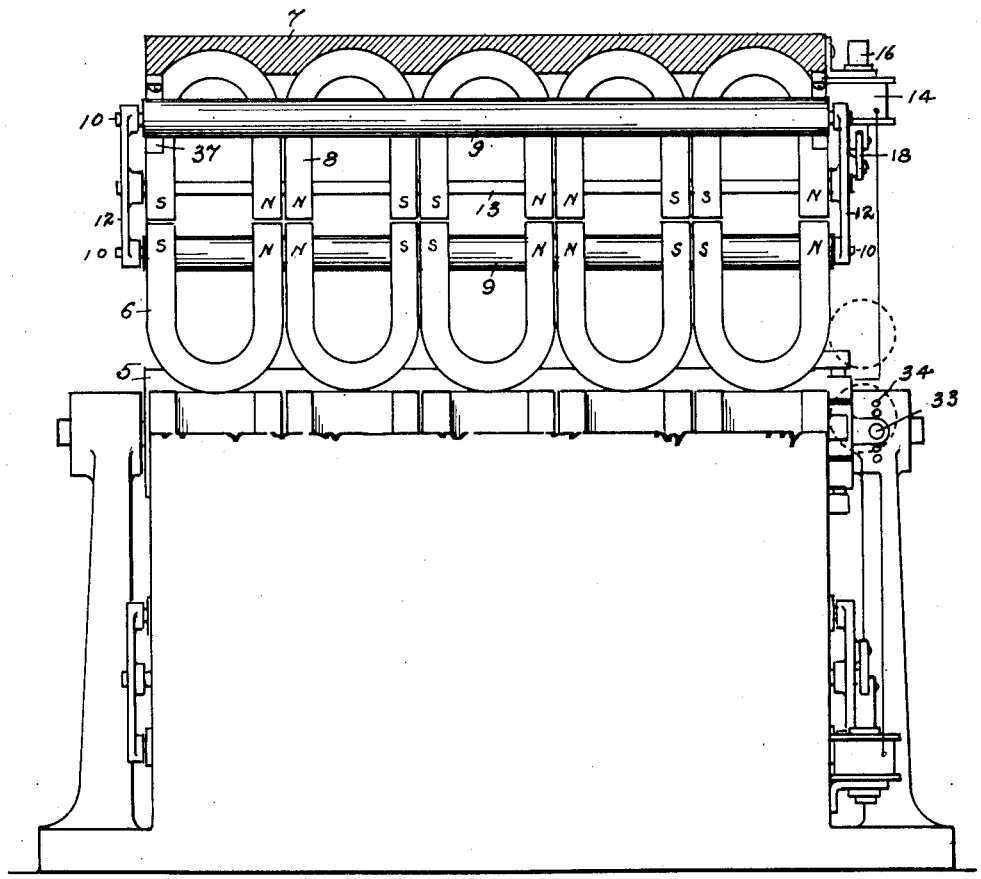

In the accompanying two sheets of drawings, Figure 1, is an end elevation, diagrammatically illustrating a motor constructed and arranged in accordance with this invention. Figure 2, is a side elevation of the same partly in cross section II—II. In detail the construction illustrated in the drawings includes the base 1, having the end pillars 2, supporting the bearings 3. The shaft 4 is journaled in these bearings and supports the rotor. The rotor comprises a square block 5, fixed to the shaft 3, and provided with sockets to receive the horse shoe magnets 6, bolted to the block 5, and radiating from the axis of the shaft 4. In the present instance there are four series of magnets set at ninety degrees of the circle, and arranged longitudinally of the shaft, with the north pole of each magnet arranged in proximity to the north pole of the adjacent magnets and the south pole of the second magnet in proximity to the south pole of the third magnet and so on through the series, like poles being in proximity to each other. The rotor as a whole is centrifugally balanced to reduce vibration and torque inequalities.

The fixed magnetic field comprises the nonmagnetic ring 7, mounted on the base 1, concentric with the rotor and has transverse sockets to receive the horse shoe magnets 8, bolted therein, in radial lines registering with the lines of the magnets 6 on the rotor. These magnets 6 and 8 have their poles in proximity, separated by the minimum air gap for rotative clearance. The magnets 8 are arranged transversely with their like poles adjacent, see Figure 2, that is, the north pole of the second magnet is in proximity to the north pole of the first magnet, and the third magnet has its south pole in proximity to the south pole of the second and so on throughout the length of each series, as described in connection with the rotor. But the north poles of the magnets 6 on the rotor are in juxtaposition to the north poles of the magnets 8 on the ring 7, so that when they are in radial alinement they oppose or repel each other, until the magnetic shunt is rolled across the poles of the magnets 8.

These magnetic shunts consist of the rollers 9 having pin trunnions 10 in their opposite ends, engaging the slots 11, in the opposite ends of the walking beams 12, fixed on the nonmagnetic pivots shafts 13, oscillatable in brackets fixed to their respective magnets 8. These walking beams are operated by the solenoids 14 and 15 mounted on the ring 7, on opposite sides of the pivots 13 and having their respective cores 16 and 17, pivoted to the beams 12, by the links 18 and 19. In the present embodiment there are eight series of field magnets, arranged in groups of two, under the control of the four walking beams, adapted to actuate the four series of magnets 6 on the rotor.

Each of these solenoids 14 and 15 are connected by the positive wire 20, with the generator 21, for supplying the actuating electric current. Each of the solenoids has its respective division wires 22 and 23, connected with the contact segments 24, 25, 26, 27, 28, 29, 30 and 31 on the insulated commutator 32, oscillatable on the bearing 3, concentric with the shaft. The commutator is locked in adjusted position by the stop 33 on the commutator engaging the quadrant holes 34 arranged in the bearing 3. The shaft 4 is grounded with the negative (−) wire 35 of the generator. Each of the series of four pole magnets 6 on the rotor is provided with a brush contact 36 riding on the commutator 32; whereby the various solenoids are energized seriatim as the rotor revolves, to shunt the magnets 8 that the magnets 6 may pass, and to shunt the magnets 8 in advance of the magnets 6, to alternately repel and attract the rotor pole magnets 6.

To elevate the rollers 9 out of contact with their respective magnets 8, the cams 37 are attached to the interior of the ring 7 and lie upon the edges of the magnets 8. The ends of the cams are tapered to a thin edge, so that the rollers advance onto them without jumping as they gradually leave the surface of the magnets and remove the depolarizing influence therefrom. The slots 11, permit the rollers to tractively engage the surface of the magnets and the cams 37, throughout their curve of motion, under control of the oscillating walking beams 12.

This invention operates substantially as follows: Referring to Figure 1, the magnet 6—A and 8—A being normally polarized and their north and south poles being in opposition, the rotor is being driven forward, clockwise, by the repulsion of said magnets. The magnet 8—B is then shunted by the roller 9 and the magnet 6—A is attracted. As the rotor magnet 6—A alines with the field magnet, 8—B, see dotted lines, the contact brush 36 on 6—A, passes onto the commutator contact segment 25, from the contact segment 24, which deenergizes the solenoid 14, of magnet 8—A, and energizes solenoid 15 of magnet 8—A, which reverses the walking beam 12 controlled thereby, to shunt 8—A and withdraw the shunt on 8—B, by throwing the rollers 9 into the dotted positions shown, to cause 8—B to repulse 6—A as described.

This action described in connection with the field magnets 8—A and 8—B, with relation to rotor magnet 6—A, is repeated by field magnets 8—C—D—E—F—G—H as the rotor magnets 6—B—C—D advance into the same relative positions. The same cycle of actions take place as each rotor pole magnet advances into the eight magnetic fields of attraction and repulsion, as described. The solenoids 14 and 15 derive their energizing current from a battery or the generator 21, in this instance driven from an outside source.

The speed of the rotor is determined by advancing and retarding the commutator 32, to cut in the various solenoids 14 and 15 at any desired position of the rotor. From the neutral point the commutator may be retarded until the rotor is repulsed and attracted to rotate in the opposite or contraclockwise direction. The motor is stopped by opening the switch 38 in the line 20.

For simplicity of disclosure I have shown only four poles on the rotor and eight on the field, but it is obvious that this arrangement may be varied as to relative numbers; or by mere reversal of parts the operation of the rotor and the fields may be reversed so that the fields would revolve around a fixed center; or the magnetic shunts 9, may be operated on the rotor instead of the magnets 8, and other changes within the spirit of this invention may be made by those skilled in this art without the exercise of the inventive faculty. Various modifications will be manifest to those desiring to take advantage of my discovery and invention.

Having thus described this invention what I claim and desire to secure by Letters Patent is:

1. A motor comprising in combination a movable permanent magnet, a fixed permanent magnet, the poles of said magnets being arranged in repulsive relation and means for modifying the flux of said magnets whereby the movable magnet will move past said fixed magnet.

2. A motor comprising in combination a movable permanent magnet, a fixed permanent magnet, the poles of said magnets being arranged in repulsive relation and means for shunting the flux of one of said magnets so as to cause said magnets to pass.

3. A motor comprising in combination a movable permanent magnet, a fixed permanent magnet, the poles of said magnets being arranged in repulsive relation and means for moving a magnetic material into and out of the flux of said magnets so as to cause said magnets to pass one another.

4. A motor comprising a rotor, permanent magnets carried by said rotor, having their poles parallel to the axis of said rotor, a stator, permanent magnets carried by said stator having their poles also arranged parallel to the axis of said rotor the poles of the magnets upon the rotor and upon the stator being arranged in repulsive relation and means for intermittently modifying the magnetic flux of certain of said permanent magnets.

5. A motor comprising a rotor and a stator, permanent magnets carried by said rotor and stator arranged in repulsive relation and electrically operated means controlled by said rotor for modifying the magnetic flux of certain of said magnets so as to cause rotation of said rotor.

6. A motor comprising a rotor and a stator, permanent magnets carried by said rotor and stator the poles of said magnets upon the rotor and upon the stator being arranged in repulsive relation and electrically operated means controlled by said rotor for modifying the magnetic flux of the permanent magnets carried by said stator so as to cause rotation of said rotor.

7. In a motor the combination of a movable permanent magnet, a fixed permanent magnet the poles of said magnets being arranged in repulsive relation and a magnetic roller adapted to be rolled upon one of said magnets to serve as a magnetic shunt therefor whereby said movable magnet will be caused to move past said fixed magnet.

8. In a motor the combination of a rotor, permanent magnets mounted upon said rotor, a stator, permanent magnets upon said stator the poles of said magnets upon said rotor and upon said stator being arranged in repulsive relation and magnetic roller means intermittently operated to magnetically shunt certain of said magnets thereby causing rotation of said rotor.

9. A motor comprising in combination a base, a rotor supported by said base, a series of permanent magnets upon said rotor with the poles thereof projecting outwardly from the axis of said rotor, a series of fixed permanent magnets arranged in a field surrounding said rotor, the poles of said field and rotor magnets being set so as to pass in repulsive relation to each other, magnetic shunts across the poles of one of said series of magnets and means for moving said magnetic shunts into and out of the magnetic fields of said series of magnets as said rotor magnets approach and recede from said field magnets.

10. A motor comprising in combination a base, a rotor supported by said base, a series of permanent magnets on said rotor arranged on radial lines and with the poles thereof projecting outwardly, a series of fixed permanent magnets arranged in a field surrounding said rotor with the poles thereof projecting inwardly, the poles of said rotor and field magnets being arranged in repulsive relation, magnetic roller shunts for one of said series of magnets and means for moving said roller shunts so as to alternately increase and diminish the magnetic flux of said series so as to cause rotation of said rotor.

11. A motor comprising in combination a base, a rotor mounted upon said base, a series of permanent magnets on said rotor, a series of fixed permanent magnets arranged in a field surrounding said rotor the poles of the magnets being arranged in repulsive relation, magnetic shunt rollers for one of said series of magnets, cam means for moving said shunt rollers so as to increase and diminish the magnetic flux of said magnets and solenoids for operating said rollers upon said cams.

12. A motor comprising a stator, a series of permanent magnets mounted upon said stator in repulsive relation, a rotor, a series of permanent magnets mounted upon said rotor in repulsive relation, the magnets in each of said series also being arranged in repulsive relation and means for modifying the magnetic flux of certain of said magnets to cause rotation of said rotor.

13. A motor comprising a rotor and a stator, permanent magnets carried by said rotor and stator arranged in repulsive relation and means controlled by said rotor for modifying the magnetic flux of certain of said magnets so as to cause rotation of said rotor.

In testimony whereof I have hereunto affixed my signature.

HARRY L. WORTHINGTON.